(12) United States Patent
Jobs et al.

(10) Patent No.: US 7,797,643 B1
(45) Date of Patent: Sep. 14, 2010

(54) LIVE CONTENT RESIZING

(75) Inventors: Steven P. Jobs, Palo Alto, CA (US);
Stephen O. Lemay, San Francisco, CA (US); Jessica Kahn, San Francisco, CA (US); Sarah Wilkin, Menlo Park, CA (US); David Hyatt, Mountain View, CA (US); Jens Alfke, San Jose, CA (US); Wayne Loofbourrow, San Jose, CA (US)

(73) Assignee: Apple Inc., Cupertino, CA (US)

( * ) Notice: Subject to any disclaimer, the term of this patent is extended or adjusted under 35 U.S.C. 154(b) by 600 days.

(21) Appl. No.: 10/951,915

(22) Filed: Sep. 27, 2004

Related U.S. Application Data

(60) Provisional application No. 60/582,868, filed on Jun. 25, 2004.

(51) Int. Cl.
*G06F 3/048* (2006.01)

(52) U.S. Cl. .................. 715/815; 715/220; 715/833

(58) Field of Classification Search .............. 715/501.1, 715/513, 520, 760, 833, 518, 788, 801, 783, 715/798, 220, 229, 815
See application file for complete search history.

(56) References Cited

U.S. PATENT DOCUMENTS 5,838,323 A    11/1998  Rose et al.
5,867,164 A    2/1999   Bornstein et al.
5,877,758 A *  3/1999   Seybold ................... 715/866
6,055,550 A *  4/2000   Wallack .................... 715/229
6,424,362 B1   7/2002   Bornstein et al.
6,915,294 B1   7/2005   Singh et al.
6,988,241 B1 * 1/2006   Guttman et al. ............. 715/220
7,222,308 B2 * 5/2007   Sauermann et al. ......... 715/833

OTHER PUBLICATIONS

"The Complete Idiot's Guide to Microsoft Outlook 2000" by Bob Temple, published by Que, copyright 1999 Que.*
The product "Microsoft Outlook 2000 SP-3", copyright 1995-1999 Microsoft Corporation, as evidenced by screenshots.*
Klein et al., "Visual Information retrieval with the SuperTable + Scatterplot", Proceedings, Sixth International Conference on Information Visualization, IEEE 2002.*

* cited by examiner

*Primary Examiner*—William L Bashore
*Assistant Examiner*—Andrew Tank
(74) *Attorney, Agent, or Firm*—Fenwick & West LLP

(57) ABSTRACT

A user interface comprises an interactive control and method for quickly changing the amount of text displayed in each item in a list of text items. The control allows the user to choose from a large range of choices for how much text is displayed and provides live updates of the changes. The method saves the user time by eliminating the need to refresh the screen when changing the amount of text displayed.

33 Claims, 12 Drawing Sheets

LIVE CONTENT RESIZING

RELATED APPLICATIONS

This application claims priority from U.S. Provisional Application Ser. No. 60/582,868, filed Jun. 25, 2004 by S. P. Jobs, et al. This application also is related to application Ser. No. 08/536,903 entitled "Document Summary Computer System User Interface," filed on Sep. 29, 1995 by D. Rose et al. and now issued as U.S. Pat. No. 5,838,323. This application also is related to application Ser. No. 09/241,255 entitled "Auto-Summary of Document Content," filed on Feb. 1, 1999 by J. Bornstein et al. and now issued as U.S. Pat. No. 6,424,362, which is a continuation of application Ser. No. 08/536,020 entitled "Interactive Document Summarization," filed on Sep. 29, 1995 by J. Bornstein et al. and now issued as U.S. Pat. No. 5,867,164. This application also is related to application Ser. No. 10/200,806 entitled "Interactive Document Summarization," filed on Jul. 22, 2002 by J. Bornstein et al., which is a continuation of application Ser. No. 08/536,020 entitled "Interactive Document Summarization," filed on Sep. 29, 1995 by J. Bornstein et al. and now issued as U.S. Pat. No. 5,867,164, all of which applications are incorporated herein by reference.

FIELD OF THE INVENTION

This invention relates to controlling content displayed in a user interface, and more particularly, to a control and method for live resizing of displayed content.

BACKGROUND

With the ever-increasing amount of electronic information available, such as via the Internet, locating desired information can take a long time. For example, when searching for content on a specific topic a user often is presented with a few items that the user is interested in and many others that the user is not interested in.

Existing formats for displaying content often take the form of a list of blocks of text corresponding to each respective item. In a list, such as those displaying search or other user-initiated query results, the amount of content displayed in each block of text varies greatly. For example, one block of text in the list may include only three lines of text and another block of text within the same list may include twenty lines of text. Many conventional display formats provide the user a single format for viewing the list of text blocks, with no options for changing the output to show smaller or larger amounts of text in the blocks. Therefore, if a user desires quickly to see what the search has produced, the user must scroll through all of the items, which may take a long time if the amount of text displayed in the text blocks is large.

Some existing formats for displaying content have more than one granularity level for the amount of text displayed. For example, in a user-initiated term-based search, one existing format provides a first display option that shows, for each document found, sections of the document containing the search term and a second display option that shows only the title of each document. However, such formats generally are limited to just a few predetermined choices, such as a choice between a smaller amount of text, for example a title, and a larger amount of text, for example several paragraphs. As a result the user has little control over how much text is displayed. The user may want to quickly scan query results for a desired topic. However, the smaller option may not include enough information to discern whether a particular query result is on topic. On the other hand, the larger option may show too much text, requiring the user to spend significant time scrolling through the displayed results, including switching between pages of displayed results to see all of the results, thus decreasing the efficiency of the search. In addition, even with more than a few options for display of information, most systems have no mechanism to determine if any of the options provide the user the amount of information that will best suit the user's purpose and provide no option for continuously varying the amount of text displayed.

An additional problem with such limited option display formats is that the change is not immediately reflected in the display as the user changes back and forth between the options; the user must refresh or wait for the screen to reload. A related problem is that when the refresh occurs, generally the user is returned to the top of the list of displayed results. This process is problematic, for example, if the user begins with the smaller option, finds an interesting item part way down the list, and wants to see the expanded version of that item. Upon refresh, generally the display will return to the top of the list or query results. Thus, unless the user wants to see the expanded version of the first item, the user must re-scroll down to the desired item to see its expanded version, resulting in wasted search time.

Traditional systems also maintain no record of users' search display preferences. As a result, in a display format that defaults to displaying the smaller option content, either in general or specific to searching for particular content, a user who prefers the larger option must switch to that option each time the user runs a search. In addition, even systems that do maintain such a record contain few display options as described above, and thus do not accurately record users' display preferences.

SUMMARY OF THE INVENTION

The present invention provides the ability to quickly change the amount of text displayed in a list of query results or articles at multiple levels of granularity and continuously via a user interface control. By allowing the user to choose from a large range of choices for how much text is displayed, the display format flexibly conforms to the user's desires. In addition, the changes occur "live" as the user changes the level of granularity, eliminating the need for the user to refresh the screen to achieve the desired amount of text displayed. In one embodiment, the invention allows some portion or portions of the text to be designated as critical (by the user or the author) so that they are displayed regardless of the selected granularity level.

In one embodiment, these features are achieved via an on-screen control, such as a slider, that allows the user to dynamically increase or decrease the amount of text displayed. As the user slides the slider control to one end, the amount of text displayed increases toward a maximum amount and to the other end, toward a minimum amount. Thus, instant visual feedback is provided without requiring the refreshing or reloading of the screen or of the results.

In one embodiment, the present invention also prevents the user from having to re-scroll through the result list to locate the item of interest. This aspect is accomplished by pinning the location of the topmost article displayed within the list of items. For example, before the user moves the slider, the present invention records which item in the list is at the top of the viewing screen. Then, as the user moves the slider to adjust the granularity of the displayed items, the item remains at the top of the screen.

In addition, in one embodiment the present invention tracks the user's preference as to how much text the user prefers to have displayed, and optionally stores the preference as the user's default setting. In one embodiment, there is provided a setting to specify whether or not to store this information, according to user preference and/or content.

In one embodiment, the present invention changes the amount of text displayed continuously in conjunction with movement of the slider using standard truncation, for example, line-by-line or sentence-by-sentence. In another embodiment, the invention uses an algorithm to produce a series of summaries as options for changing the amount of text displayed.

In one embodiment, the list of displayed items is produced by a text-based search. In another embodiment, the list is a grouping of items, such as news articles on a particular topic. In yet another embodiment, the list displayed may comprise other items, such as files in a file system.

BRIEF DESCRIPTION OF THE DRAWINGS

FIGS. 3A and B are illustrations of text pinned in position in a user interface in accordance with one embodiment of the present invention.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE EMBODIMENTS

Integrated User Interface

Figure 1A:
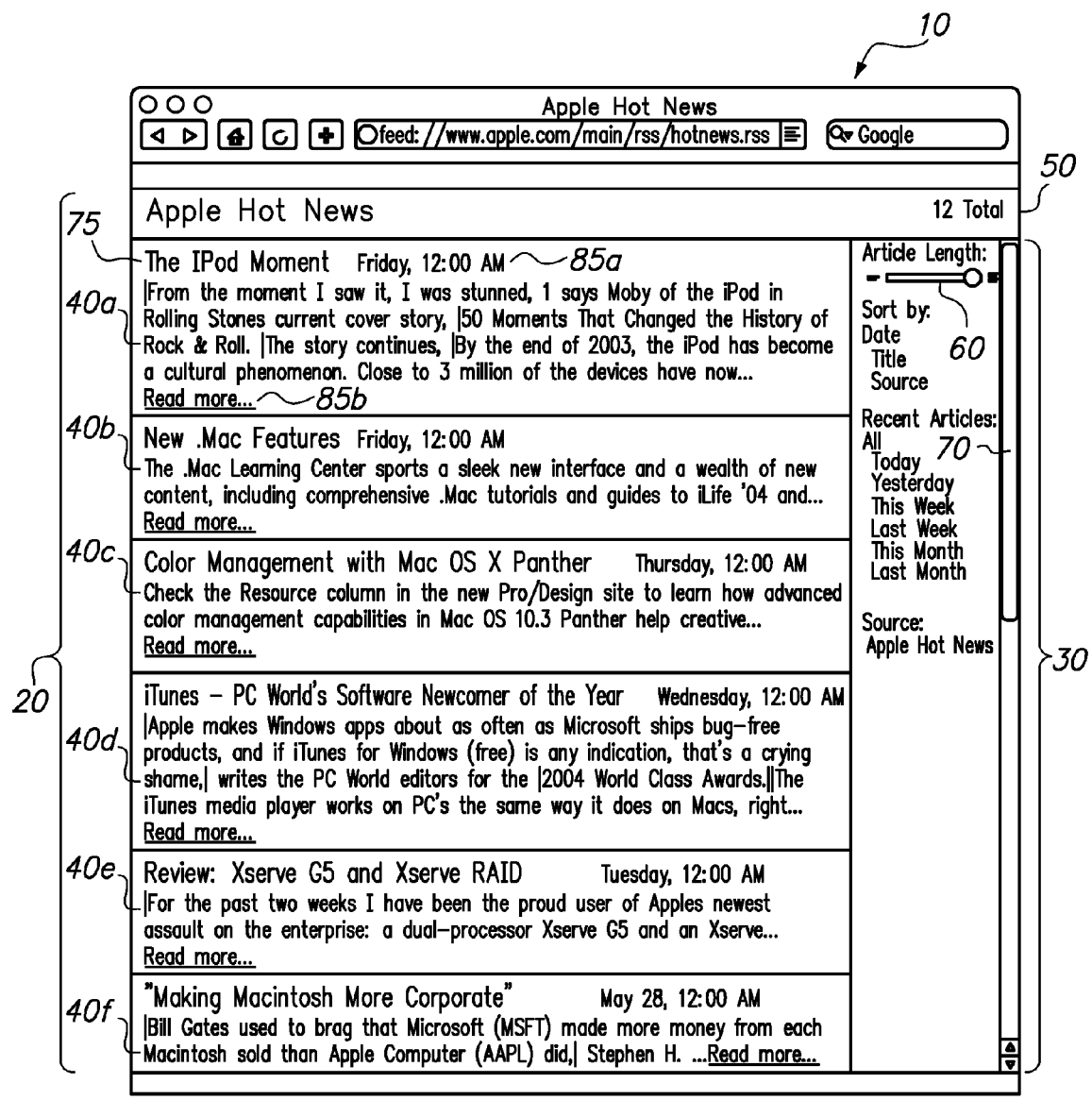
FIGS. 1A-F are illustrations of various amounts of text displayed in a user interface in accordance with one embodiment of the present invention.

Referring now to FIG. 1A, there is shown a user interface 10 displaying query results in the form of text blocks in accordance with one embodiment of the present invention. The user interface 10 includes two main areas: a result display area 20 and a control area 30. The graphical or visual organization and placement of the areas in the user interface 10 of FIGS. 1A-F is merely illustrative and not limited by the present invention, and variations in the placement, size, and shape of the areas would be readily apparent to those of skill in the art of user interface design.

The result display area 20 in its basic form is the area of the user interface 10 for displaying user-initiated query results to the user. The control area 30 is the area containing the controls for modifying the result display area 20 content.

The result display area 20 includes query result items 40 and an indication of the total number of results displayed 50.

In the example of FIG. 1A, the results display area 20 displays six query result items 40a-f. The total item number indicator 50 shows that there are a total of twelve query results items 40, although only six items 40a-f are depicted. The remaining six query result items 40 are currently outside the displayed area of the user's screen.

In the example depicted in FIG. 1A, the individual query result items 40 are each "hits" resulting from a user-initiated text or other query, and thus display content associated with the user's query. Each query result item 40 contains a heading 75, a text block 80, and optionally, one or more universal indicators 85. The heading 75 is an indication of the subject of the query result item 40, such as a title. The text block 80 contains the text associated with the heading 75; in one embodiment, text block 80 is the aspect of the query result item 40 that the present invention modifies according to the techniques described herein. As shown, the size of text block 80 may vary among query result items 40. For example, items 40a and 40f show six lines of text, item 40b shows three lines of text, and item 40c shows four lines of text. The variance in text block 80 size may be due to, for example, pre-existing variations in the overall length of the respective query results.

The universal indicators 85 are text portions not included in the text block 80 of the query result item 40, and in one embodiment, are always displayed for each visible query result regardless of granularity level. For example, the indicators 85 may display a date (85a) or a link (85b) to the full text of the query result 40. In one embodiment, the user may alter which aspects of the result 40 remain constant regardless of the chosen granularity. In another embodiment, universal indicators 85 are omitted or not used.

Figure 2:
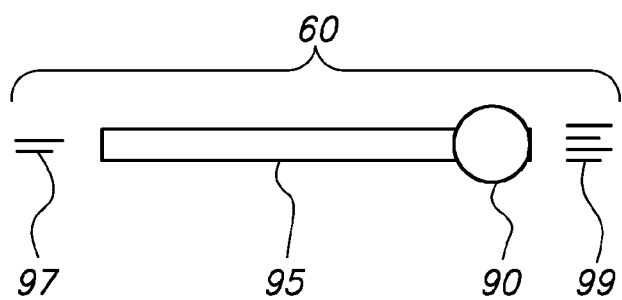
FIG. 2 is enlarged version of a control as part of a user interface in accordance with one embodiment of the present invention.

The control area 30 includes a control 60, which in this example is a slider 60, and a scroll bar 70. The control 60 is the aspect of the invention that controls the software providing the core functionality. Referring still to FIG. 1A and referring to an enlarged version of the control 60 shown in FIG. 2, the slider 60 includes a control element 90 that moves, in this example horizontally, on a slide bar 95. The element 90 is movable in two directions: one direction toward a minimum amount of text 97, and one direction toward a maximum amount of text 99. In the example depicted in FIG. 1A, the element 90 is at the maximum end 99, indicating that the query results items 40 display the maximum amount of text in their respective text blocks 80. In one embodiment, the slider 60 may contain a large number of steps between the minimum 97 and maximum 99 to create steps of very fine granularity, for example spanning values 0-100. In one embodiment, the scale is linear. In another embodiment, the scale is logarithmic, with initial movement changing the amount of text more quickly, and slowing down as the user approaches the desired amount. In one embodiment, the movement is continuous; the user is unable to discern the individual "steps." In another embodiment, the steps are individualized, discrete movements discernable by the user.

In one embodiment, the change in the amount of text displayed is substantially immediate (or "live") in response to movement of the element 90 on the slider 60. This aspect of the present invention is advantageous because it eliminates the need for the user to refresh the screen to achieve the desired amount of text displayed. In another embodiment, the user hits a key or clicks a button to affect changes in the display. In another embodiment, a dialog box is presented including an "apply" button for effecting changes.

The scroll bar 70 is a control used to scroll the list of query result items 40, in this example vertically up or down. In the example depicted in FIG. 1A, the scroll bar 70 takes up approximately half of its possible length, indicating the fraction of the page that currently is visible on the screen.

Figure 3A:
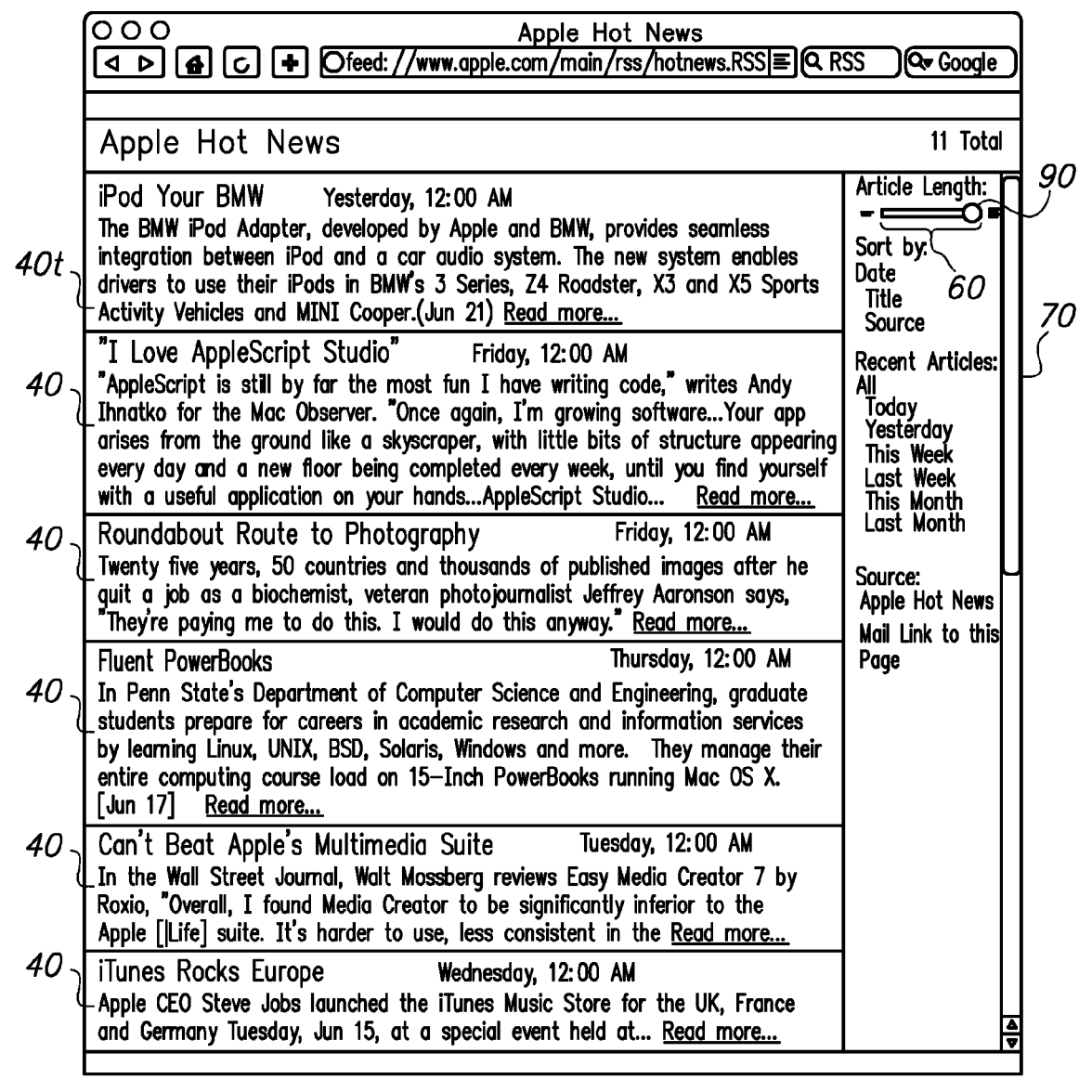

Referring briefly to FIGS. 3A and B, another example of a user interface 10 displaying query results in the form of text blocks in accordance with one embodiment of the present invention is shown. In this example, the scroll bar 70 as shown is not at the very top of its possible length, indicating that the topmost query result item 40 displayed (40t) is not the topmost item of the entire list of query result items 40. In other words, there are one or more query result items 40 off the top of the screen, and thus not shown, above query result item 40t.

Figure 3B:
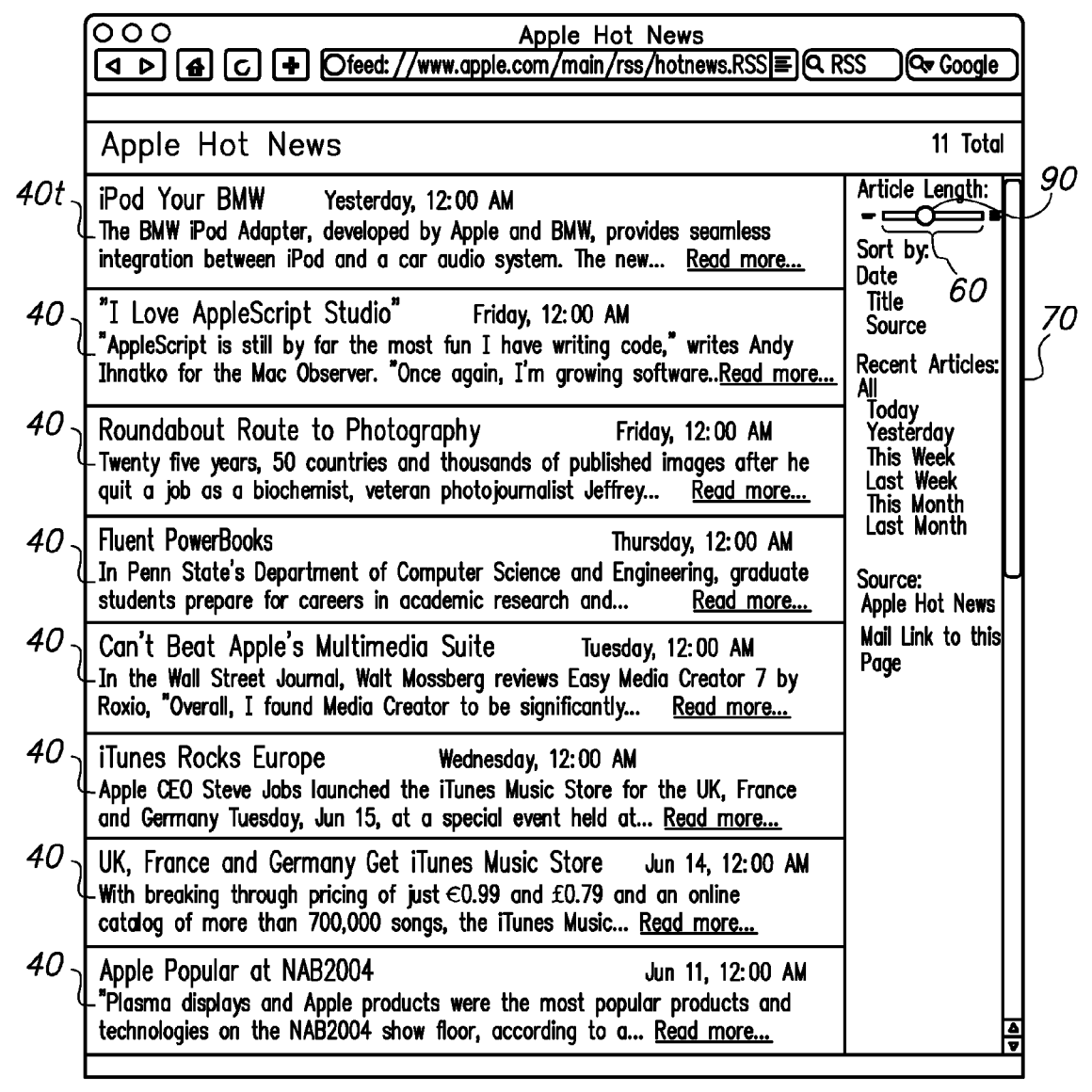

As the user moves the control element 90 from the maximum value 99 of FIG. 3A closer toward the minimum value end 97 as displayed in FIG. 3B, in one embodiment the position of the topmost item 40t within the list of query result items 40 remains at the top of the visible display. The topmost item 40t remains in the top position even though it is not the topmost item 40 in the list. The system maintains the topmost item 40t in this position by maintaining the top line offset as described in conjunction with the offset module 575 of FIG. 6; the system assumes that the item at the top of the screen is the item of interest to the user. This aspect of the present invention is advantageous because it tracks the location of the item the user is interested in within the list of displayed items. For example, regardless of where the control element 90 is moved on the slider 60 depicted in FIGS. 3A and B, the topmost item 40t is kept at the top. As a result, the user never has to re-scroll through the result list to locate the item 80 of interest.

Referring now to FIGS. 1A-F, collectively they show an example of how the query result area 20 display line-by-line changes as a result of moving the slider 60 from a maximum 99 amount of text displayed in the respective text blocks 80 to a minimum 97 amount to text displayed in the respective text blocks 80. Also referring to FIG. 4, there is shown a flowchart of the process for changing the size of the text blocks 80. The process begins by determining 310 that the slider 60 position has changed. If the control element 90 of the slider 60 has moved toward the minimum value 97 end, it is first determined 315 which is the longest text block 80. Then, the longest text block 80 is shortened 320 one increment. Next, in response to continued movement of the slider 60 toward the minimum end 97, it is determined whether the text blocks 80 all are of equal size 325, and if not, steps 315 and 320 repeat with the next longest text block(s) 80 as the user moves the slider 60 toward minimum 97, until all blocks 80 are of equal size. In some examples, the longest text block 80 at any given time may be more than one text block 80, in which case the longest blocks 80 are shortened 320 together in conjunction with continued movement of the slider 60 until they are the length of the next longest block(s) 80. Then, all of the text blocks 80 are shortened collectively 330 in conjunction with continued movement of the slider 60 until they reach the minimum length 97, at which time the element 90 of the slider 60 would be at the minimum end 97. As previously described, the changes to the amount of text displayed are substantially immediate and continuous with movement of the slider. The shortening process can be seen by referring to FIGS. 1A-F in sequence.

In the example shown in FIGS. 1A-F, the shortening is line-by-line, so a single line is removed from the longest text block(s) 80 until it has the same number of lines as the next longest text block(s) 80, and so on. In other embodiments, other increments could be used, for example word-by-word or sentence-by-sentence.

Beginning with FIG. 1A as time zero, the control element 90 of the slider 60 is at the maximum limit 99 for the amount of text displayed in the text blocks 80 of the query result area 20. In this example, items 40a and 40f show six lines of text, item 40b shows three lines of text, and item 40c shows four lines of text. The number of lines of text in the text block of item 40f is unknown to the user as of time zero, because the text block 80 of item 40f is partially off the bottom of screen. In addition, it is unknown to the user how many lines there are for the respective text boxes 80 of the other query result items 40. The process begins by determining 310 the longest text block 80 and shortening 320 it to the length of the next largest text block in response to movement of the element 90 of the slider 60.

Figure 1B:
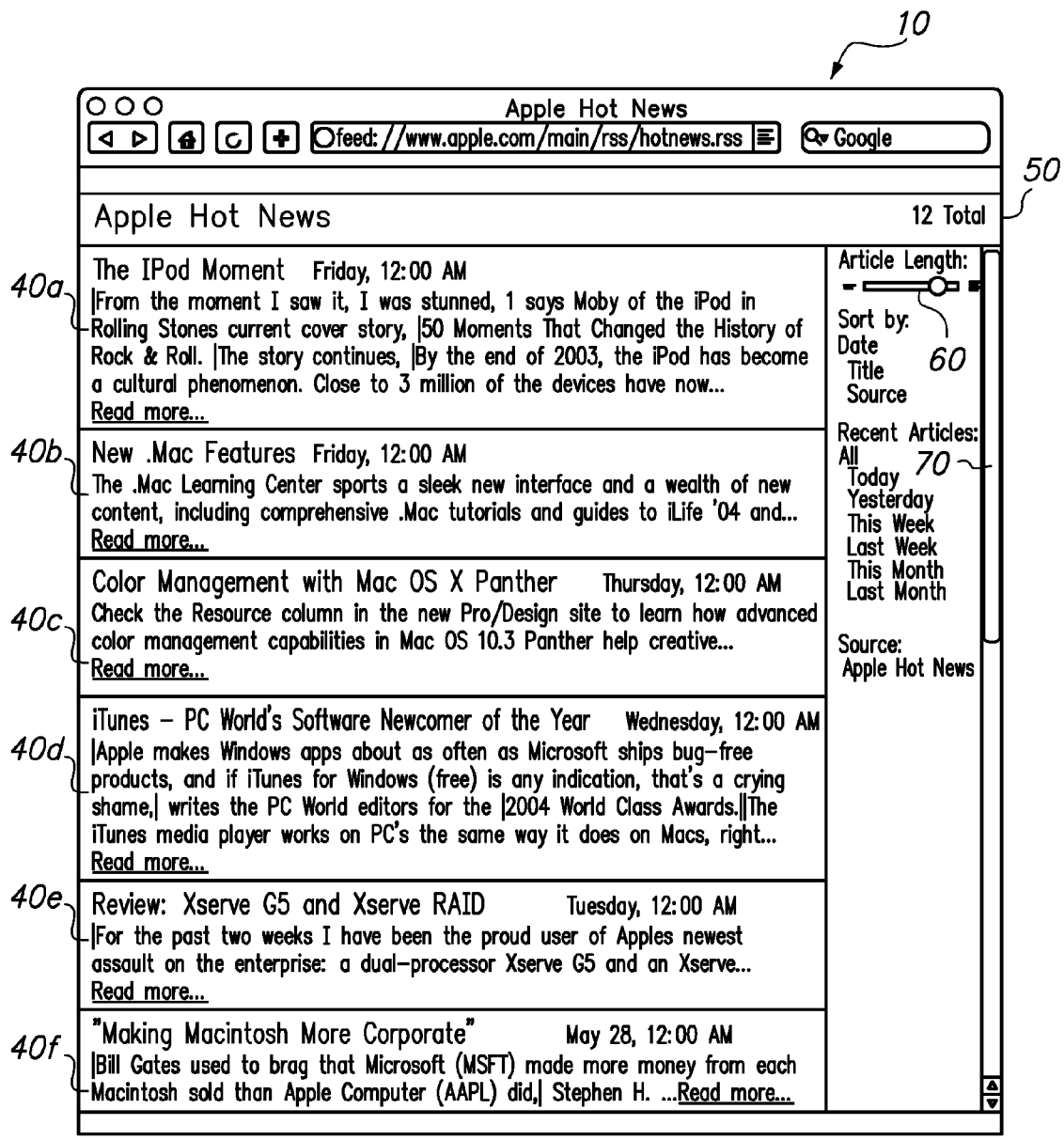

Referring now to FIG. 1B as time one, the control element 90 has moved on the slide bar 95 slightly away from the maximum text length end 99 toward the minimum text length end 97 of the slider 60. However, no change in the length of the text blocks 80 of the query result items 40a-f is shown. The reason no change has occurred is because one of the text blocks 80 not shown on the screen must have been longer than the longest text block 80 shown, i.e., longer than six lines. Thus, the text blocks 80 shown in query results 40a-f have not yet been shortened because none of them are the longest text block(s) 80. In this example, the longest text block 80 (not shown) was seven lines, and has now been shortened to six lines, i.e., to the length of the next longest text blocks 80 of items 40a and 40d.

Figure 1C:
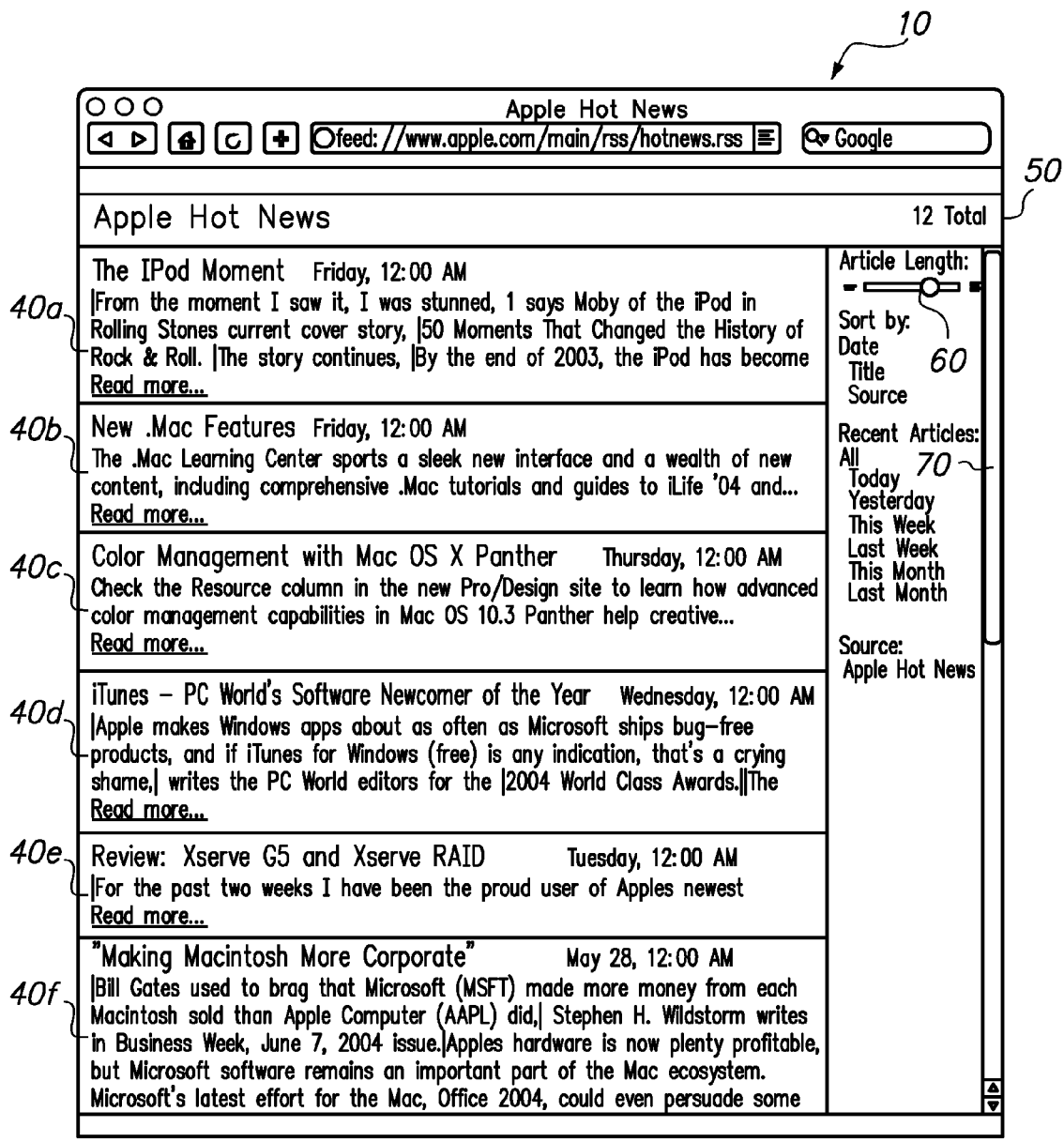

Referring now to FIG. 1C as time two, the control element 90 has moved on the slide bar 95 away from the maximum text length end 99 toward the minimum text length end 97 of the slider 60 past the position of time one. The text blocks 80 of items 40a and 40d have been shortened from six lines to five lines. In addition, now four lines of the text block 80 of item 40f, rather than two shown in FIGS. 1A and 1B, fit on the screen.

Figure 1D:
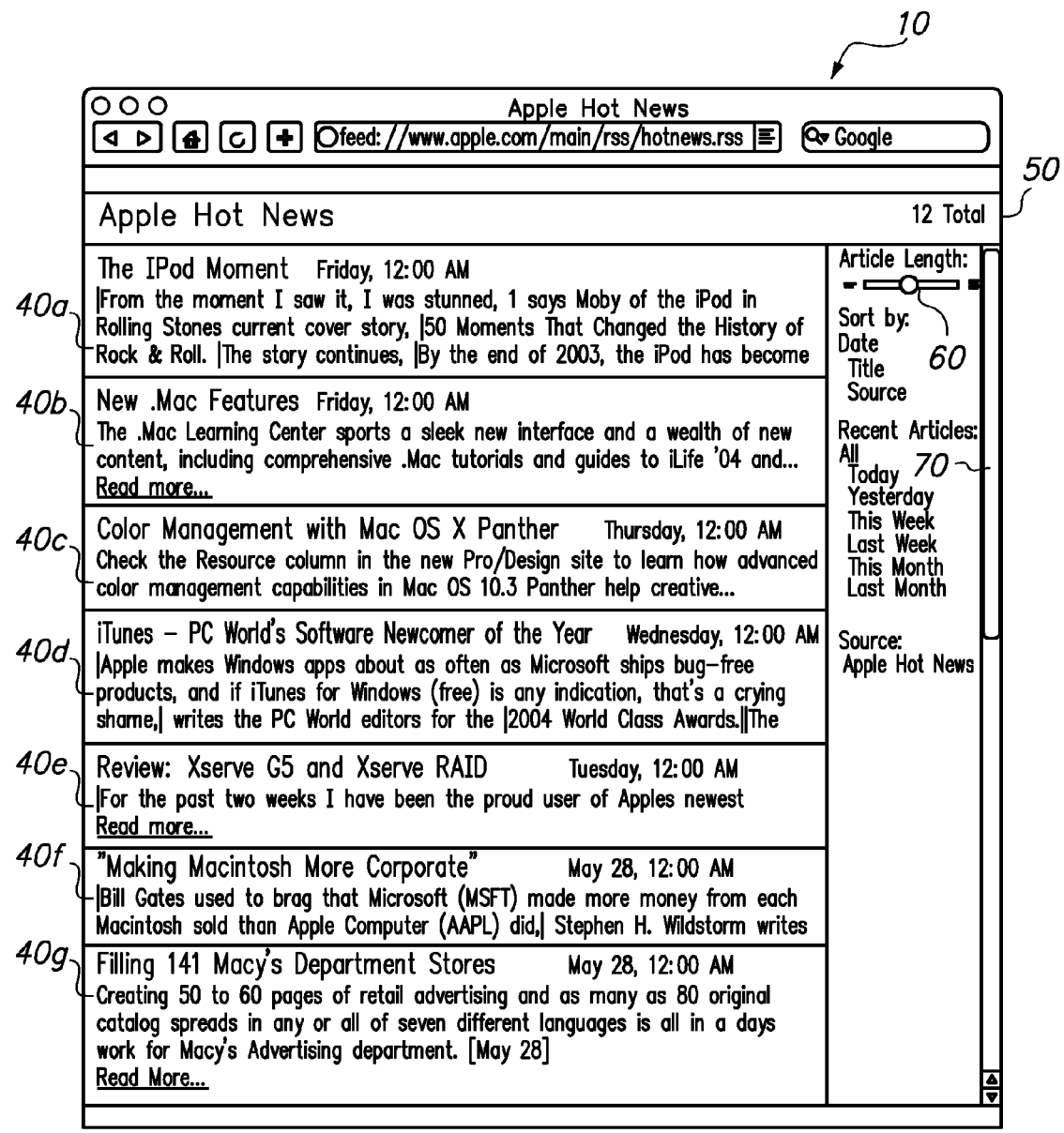

Referring now to FIG. 1D as time three, the control element 90 has moved on the slide bar 95 away from the maximum text length end 99 toward the minimum text length end 97 of the slider 60 past the position of time two. The text blocks 80 of items 40a-f now all have been shortened from five lines to three lines. In this example, the movement of the slider 60 from time two to time three was more than one "step" (e.g., removed more than one line of text), as can be seen by comparing the slider 60 position of FIGS. 1C and 1D. In addition, because the text block 80 of items 40a-f all were three lines or longer, they will now continue to decrease in size as a group.

An additional item 40g now is visible on the screen, with a text block 80 containing two lines. As a result, because the screen now displays a larger fraction of the total number 50 of query result items 40 (increased from six of twelve to seven of twelve), the length of the scroll bar 70 has increased as compared to FIGS. 1A-C.

Figure 1E:
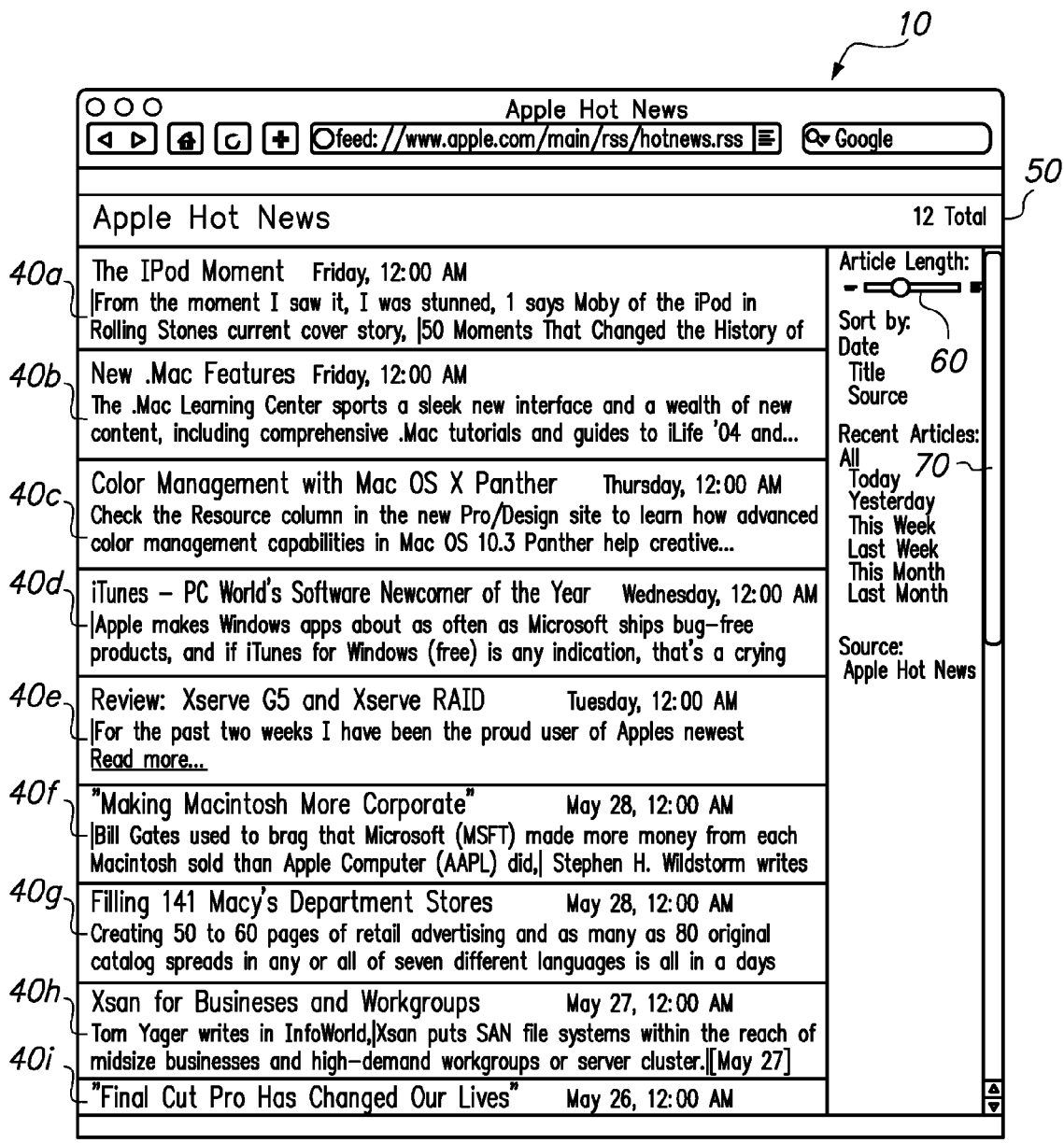

Referring now to FIG. 1E as time four, the control element 90 has moved on the slide bar 95 further toward the minimum text length end 97 of the slider 60, past the position of time three. Two additional items 40h, 40i can be seen on the screen, again reflected by the lengthening of the scroll bar 70, and all items 40 now are contain two lines of text in their respective text blocks 80.

Figure 1F:
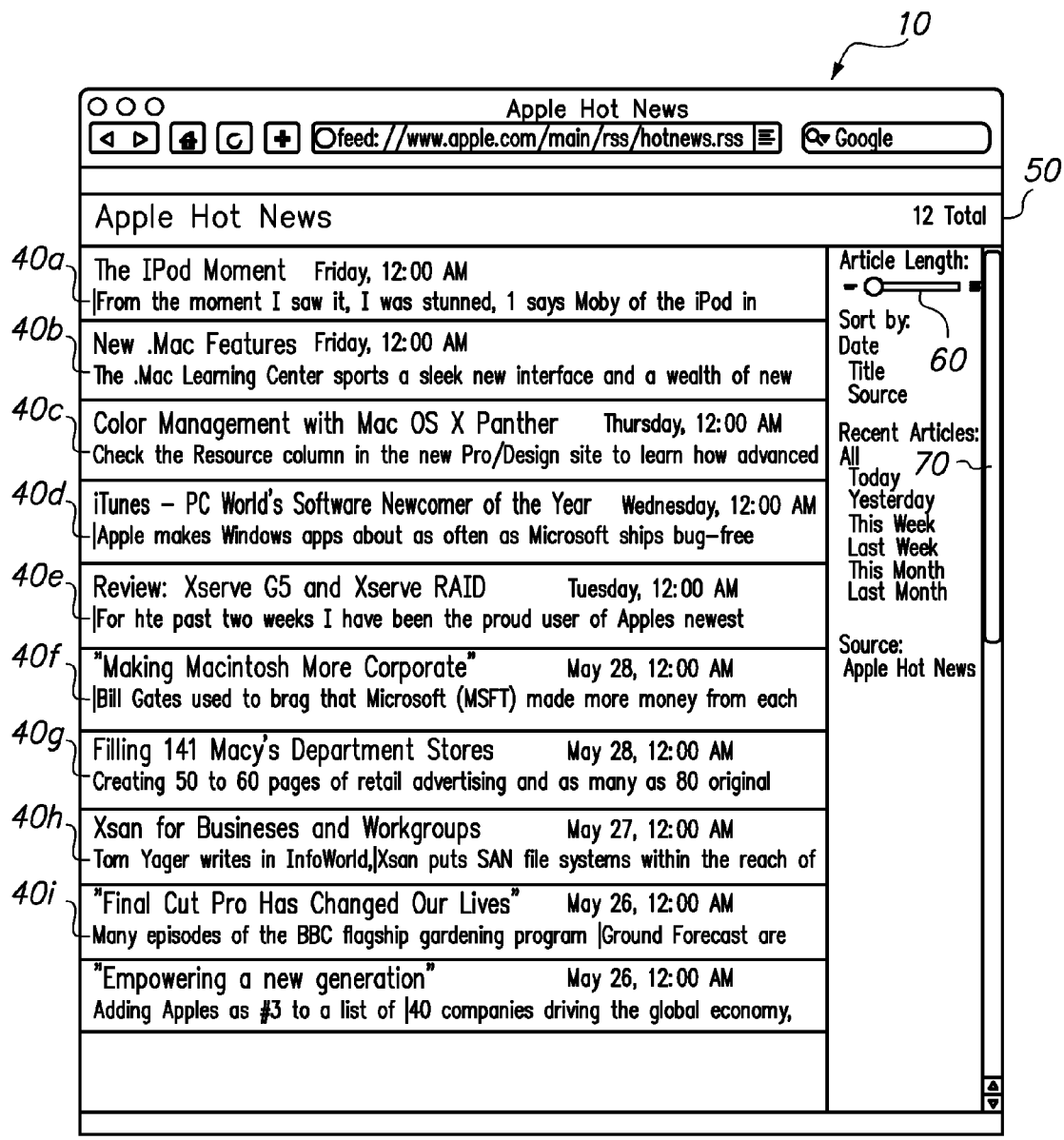

Finally referring to FIG. 1F as time five, the control element 90 has moved to the minimum text length end 97 of the slider 60. All items 40 are just one line long. A total of ten items 40 are displayed, which is reflected by the increased length of the scroll bar 70.

Figure 4:
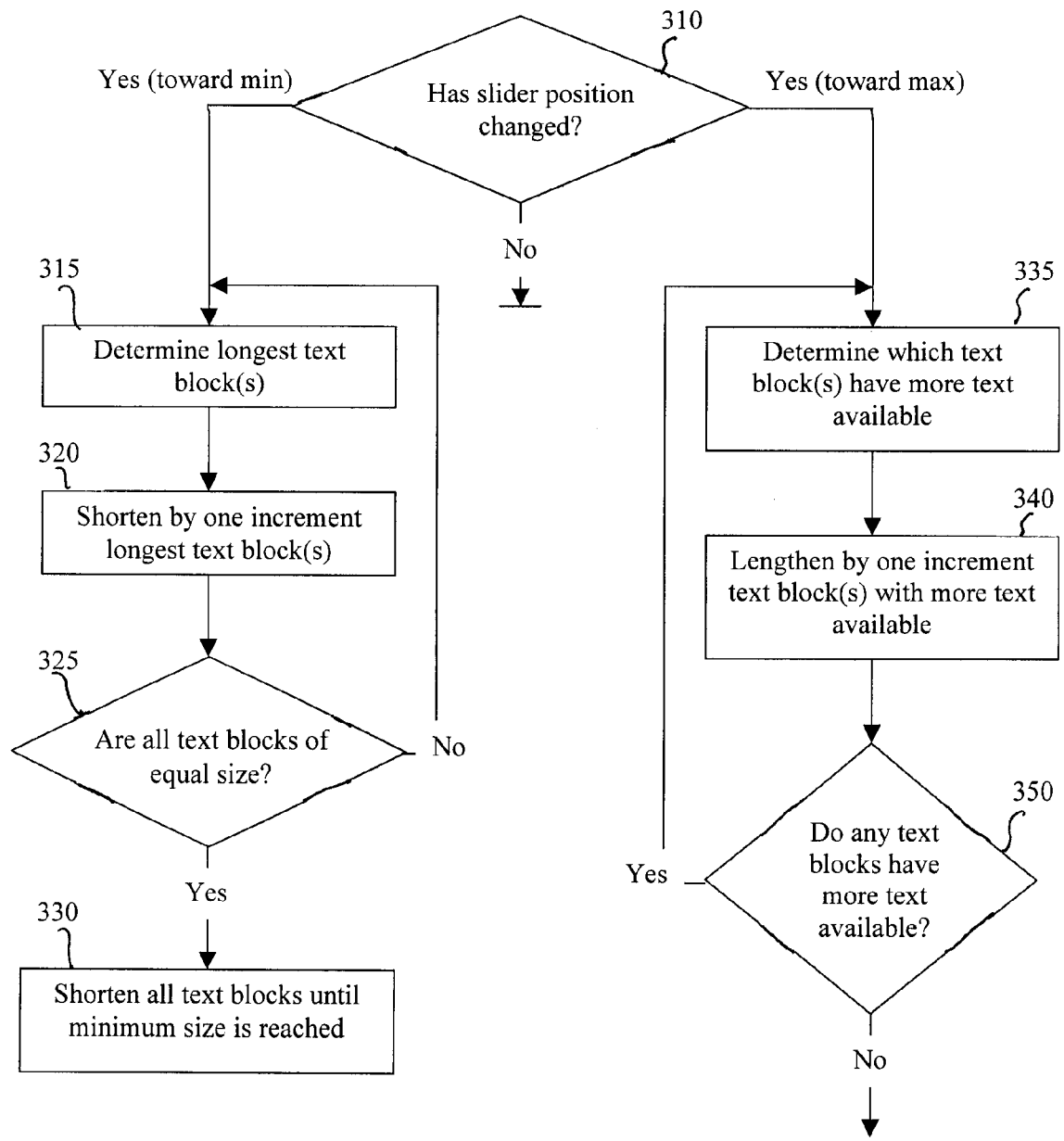
FIG. 4 is a flowchart of a process for changing the amount of text displayed in a user interface in accordance with one embodiment of the present invention.

Referring again to the flowchart of the process for changing the size of the text blocks 80 of FIG. 4, the first step is determining 310 that the slider 60 position has changed. If the control element 90 of the slider 60 has moved toward the maximum value 99 end, it is first determined 335 which text block(s) 80 have more text available to be displayed. Then, those text block(s) 80 are lengthened 340 by one increment. Next, in response to continued movement of the slider 60, it is determined 350 whether any text blocks 80 have more text available to be displayed, and if so, steps 335 and 340 repeat for the next remaining text block(s) 80 in conjunction with continued movement of the slider 60 until all blocks 80 display the maximum amount of text. An example of line-by-line lengthening of the text blocks 80 in conjunction with continued movement of the slider 60 can be seen by viewing FIGS. 1A-F discussed above in reverse order.

In other examples, length changes can be sentence-by-sentence or word-by-word. In one embodiment, the changes to the text blocks 80 reflect various length summaries of a full-text article. One embodiment of a summarization process and algorithm is described in commonly owned U.S. Pat. No. 5,838,323, the disclosure of which is incorporated herein by reference.

Figure 5:
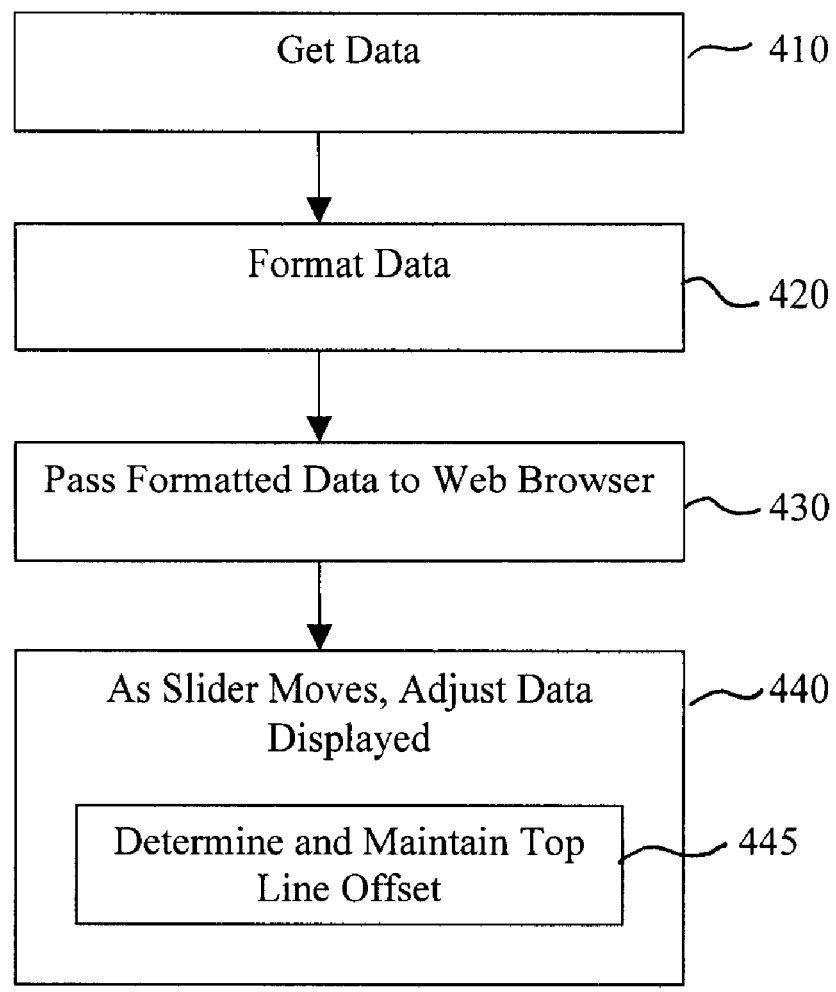
FIG. 5 is a flowchart of the process that the software follows to adjust the amount of text displayed in a user interface in accordance with one embodiment of the present invention.

Referring now to FIG. 5, there is shown one embodiment of the process that the software follows to adjust the text displayed in the text blocks 80. In this example, the process begins by retrieving 410 data, for example from a network, such as the Internet. Next, the data is formatted 420 to annotate which blocks of text should be acted upon when the slider 60 is operated. Formatting 420 includes one or more steps that may cause various alterations to the data, such as marking the data and/or inserting addition elements to maintain coherent text when portions are removed, such as ellipses. For example, for a summarization process, formatting may include adding an ellipsis to the text for inclusion when some portion of the text is removed and assigning a span class to each portion of the text 80 of the data, for example to each sentence. Applying this example, the data begins as an article with three sentences: "This is the first sentence. This is the second sentence. This is the third sentence." Then, the data is formatted 420 to include an ellipse: "This is the first sentence. This is the second sentence . . . . This is the third sentence." Next, the data is formatted 420 to assign a span class to each sentence, for example (in pseudocode):

<span class=s1>This is this first sentence.</span>

<span class=s2>This is the second sentence.</span>

<span class=ellipsis> . . . </span>

<span class=s3>This is the third sentence</span>

Once formatted, the data is passed 430, for example, to a web browser. Then, as the user moves the slider 60, the data displayed is adjusted 440 substantially instantaneously using the data now formatted for that purpose. Continuing with the above example, for an adjustment 440 to show just the first and third sentences of the article, the software would adjust 440 to a style that turned off the second sentence only, exemplary pseudocode might be "#s2 display:none." The resulting article thus would contain the first sentence, the ellipse, and the third sentence: "This is the first sentence . . . . . This is the third sentence." In one embodiment, an aspect of adjusting 440 the data displayed maintains the top line offset 445. As discussed in conjunction with FIGS. 1A-F, as the slider moves, the top item 80 displayed remains the top item 80 after resizing. This is accomplished by determining and maintaining 235 the top line offset. The steps depicted in FIG. 5 happen very quickly to enable the display to substantially immediately update the interface 10 when the slider 60 is moved.

Figure 6:
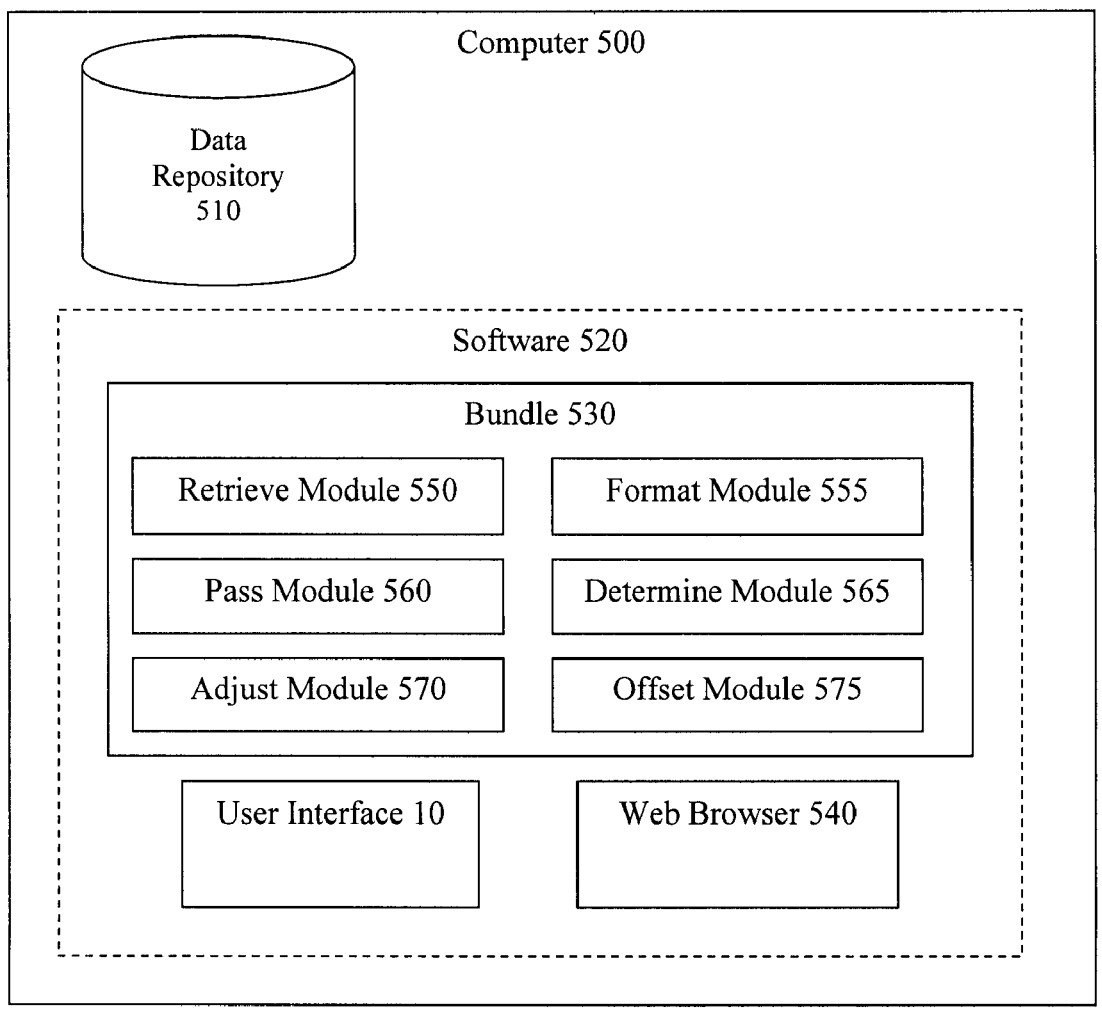
FIG. 6 is an illustration of the architecture of a system for implementing a user interface in accordance with one embodiment of the present invention.

Referring now to FIG. 6, it illustrates the architecture of a system for implementing a user interface 10 in accordance with one embodiment of the present invention. In such a system, a computer 500 is of conventional design, and includes a display, input, processor, an addressable memory, and other conventional features (not illustrated) such as a local hard disk, input/output ports, a keyboard, a mouse, and a network interface. In a preferred embodiment the computer 500 may be implemented on a Macintosh computer operating under an operating system such as Mac OS X, or a SPARC-based computer operating under UNIX, or any other equivalent devices.

In accordance with the present invention, the computer 500 operates to execute software 520 to operate a user interface 10 as described above. According to one embodiment of the present invention, the computer 500 includes a data repository 510 and various software 520.

The data repository 510 may be a conventional database accessible by the software 520, for example, through a user interface 10. The software 520 accesses and queries the repository 510 to retrieve data associated with the various software modules 550-575 and user interface 10. The repository 510 may include, for example, data regarding web page formatting, etc. In addition, the repository 510 may store various preferences, either by user or by content, such as a user preference to display the maximum amount of text.

The software 520 includes a number of executable code portions and data files for creating and supporting the user interface 10, handling input and generating output. The software 520 may be provided to the computer 500 on computer readable media, such as a CD-ROM, diskette, or by electronic communication over a network from software distributors, for installation and execution thereon. Alternatively, some aspects of the software 520 and the data repository 510 can be hosted on a server computer, and accessed over the network by the user, for example using a browser interface (not shown).

In one embodiment, the software 520 includes a bundle of modules 530, a user interface 10, a web browser 540, and a type module 545. In one embodiment, the software 520 may be contained within more than one program, as indicated in FIG. 6 by a dotted line. The bundle 530 contains various executable portions of code for controlling the user interface 10, which the web browser 540 can load at run time. The user interface 10 is the set of screens that allow the user to interact with the software 520, for example, as described in conjunction with FIGS. 1A-F. Changes to controls on the user interface 10, such as the slider 60 of FIG. 1A, initiate processes and logic of the software 520. The web browser 540 is a standard web interface that allows the user to interact with a network such as the Internet, for example, to use a search engine to retrieve articles of interest.

The module bundle 530 contains a retrieve module 550, a format module 555, a pass module 560, a determine module 565, an adjust module 570, and an offset module 575. The retrieve module 550 provides the logic for the system to perform the get data step (410) of FIG. 5, for example from the Internet. The format module 555 takes the data and formats it per the format data step (420) step of FIG. 5. The format module 555 is crucial to the live update aspect of the user interface 10.

The pass module 560 provides the logic to pass the formatted text, for example, to the web browser 540 as described in step 425 of FIG. 5. The determine module 565 provides the logic to determine characteristics of text blocks 80 during adjustment of the slider 60, for example, determining the relative size or content of text blocks 80 to perform steps 315, 325, 335, and 350 of FIG. 5. The adjust module 570 provides the logic to adjust which portions of text are visible to the user according to step 430 of FIG. 5. More specifically, it provides the capability to change the amount of text displayed, for example to shorten the text (steps 320 and 330 of FIG. 4) or lengthen the text (340). As described above, the adjust module 570, working in conjunction with the format module 555, allows for the live update of the content displayed. The offset module 575 provides the logic to maintain the first line offset (step 435 of FIG. 5), pinning the top article displayed and preventing the user from having to relocate the article of interest in the text.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs); or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

We claim:

1. In a computer system including a display screen comprising a result display area of a graphical user interface, a computer-implemented method of receiving user input for changing the amount of data displayed in the result display area of the graphical user interface, the method comprising:
   retrieving data from a data source, the data comprising a plurality of text elements;
   displaying, in the result display area, a plurality of text display blocks each comprising at least a portion of the text of each of the plurality of text elements, each text display block having a size individually determined based on the amount of data to be displayed in the block;
   displaying in a control area of the graphical user interface distinguished from the result display area, a single control for adjusting the sizes of the displayed plurality of text display blocks; and
   in response to user input moving the control in the control area:
       adjusting the size of each of the displayed plurality of text display blocks, wherein at least two of the text display blocks have different amounts of data and are displayed having different sizes, and wherein the adjusting is dynamic, visible and concurrent with moving the control.

2. The method of claim 1, wherein the step of adjusting the size of each of the displayed plurality of text display blocks comprising the portions of the text displayed is a line by line adjustment.

3. The method of claim 1, wherein the step of adjusting the size of each of the displayed plurality of text display blocks comprising the portions of the text displayed is a sentence by sentence adjustment.

4. The method of claim 1, wherein the step of adjusting the size of each of the displayed plurality of text display blocks comprising the portions of the text displayed varies the scope of a summary of the data.

5. The method of claim 1, wherein the control is a slider.

6. The method of claim 1, further comprising:
maintaining the onscreen position of the topmost text element of the data while adjusting the size of each of the displayed plurality of text display blocks comprising the portions of the text displayed.

7. The method of claim 1, wherein the data comprises news articles.

8. The method of claim 1, wherein the data comprises query results.

9. The method of claim 1, further comprising:
maintaining an aspect of the text of each of the displayed plurality of text elements throughout the adjusting the size of each of the displayed plurality of text display blocks comprising the portions of the text.

10. The method of claim 1, wherein the moving of the control in a first direction increases the size of each of the displayed plurality of text display blocks comprising the portions of the text displayed and the moving of the control in a second direction decreases the size each of the displayed plurality of text display blocks comprising the portions of the text displayed.

11. The method of claim 1, further comprising:
storing the sizes of each of the displayed plurality of text display blocks comprising the portions of the text displayed by user.

12. The method of claim 1, further comprising:
storing the sizes of each of the displayed plurality of text display blocks comprising the portions of the text displayed by type of data.

13. In a computer system including a display screen comprising a result display area of a graphical user interface, a computer-implemented method of shortening a plurality of text display blocks displayed in the result display area of the graphical user interface, the method comprising:
in response to movement of a single control displayed in a control area of the user interface distinguished from the result display area, determining a longest text display block of the displayed plurality of text display blocks, each text display block has a size individually determined based on the amount of data to be displayed in the block;
shortening by one increment the size of the longest text display block of the displayed plurality of text display blocks, wherein at least two of the text display blocks have different amounts of data and are displayed having different sizes, and wherein the shortening is dynamic, visible and concurrent with the movement of the control;
determining whether the displayed plurality of text display blocks are of equal size; and
in response to a determination that the displayed plurality of text display blocks are of equal size, shortening the sizes of the displayed plurality of text display blocks as a group until a minimum size is reached, wherein the shortening is dynamic, visible and concurrent with the movement of the control.

14. The method of claim 13, wherein the step of shortening the sizes of the displayed plurality of text display blocks is a line by line shortening.

15. The method of claim 13, wherein the step of shortening the sizes of the displayed plurality of text display blocks is a sentence by sentence shortening.

16. The method of claim 13, wherein the step of shortening the sizes of the displayed plurality of text display blocks yields a shortened summary of the data.

17. The method of claim 13, wherein the control is a slider.

18. The method of claim 13, further comprising:
maintaining the onscreen position of the topmost text display block of the displayed plurality of text display blocks while shortening the sizes of the displayed plurality of text display blocks.

19. The method of claim 13, wherein the displayed plurality of text display blocks comprise news articles.

20. The method of claim 13, wherein the displayed plurality of text display blocks comprise query results.

21. The method of claim 13, further comprising:
maintaining an aspect of each of the displayed plurality of text display blocks throughout the shortening of the sizes of the displayed plurality of text display blocks.

22. In a computer system including a display screen comprising a result display area of a graphical user interface, a computer-implemented method of lengthening a plurality of text blocks displayed in the result display area of the graphical user interface, the method comprising:
in response to movement of a single control displayed in a control area of the user interface distinguished from the result display area, determining a subset of the displayed plurality of text display blocks with more text available for display, each text display block has a size individually determined based on the amount of data to be displayed in the block;
lengthening by one increment the size of the subset of the displayed plurality of text blocks with more text available for display, wherein at least two of the text display blocks have different amounts of data and are displayed having different sizes, and wherein the lengthening is dynamic, visible and concurrent with the movement of the control; and
determining whether the displayed plurality of text blocks have reached their maximum size.

23. The method of claim 22, wherein the step of lengthening by one increment the size of the subset is a line by line lengthening.

24. The method of claim 22, wherein the step of lengthening by one increment the size of the subset is a sentence by sentence lengthening.

25. The method of claim 22, wherein the step of lengthening by one increment the size of the subset yields a lengthened summary of the data.

26. The method of claim 22, wherein the control is a slider.

27. The method of claim 22, further comprising:
maintaining the onscreen position of the topmost text block of the displayed plurality of text display blocks while lengthening the sizes of the displayed plurality of text display blocks.

28. The method of claim 22, wherein the displayed plurality of text display blocks comprise news articles.

29. The method of claim 22, wherein the displayed plurality of text display blocks comprise query results.

30. The method of claim 22, further comprising:
maintaining an aspect of each of the displayed plurality of text display blocks throughout the lengthening by one increment the size of the subset.

31. In a computer system including a display screen comprising a result display area of a graphical user interface, a computer-implemented method of receiving user input for changing the amount of data displayed in the result display area of the graphical user interface, the method comprising:

retrieving data from a data source, the data comprising a plurality of text elements;

displaying, in the result display area, a plurality of text display blocks each comprising at least a portion of the text of each of the plurality of text elements at a first level of granularity, each text display block having a size individually determined based on the amount of text to be displayed in the block;

displaying, in a control area of the graphical user interface distinguished from the result display area, a single control for adjusting the sizes of the displayed text display blocks; and in response to user moving the control in the control area:

adjusting granularity for the size of each of the displayed text display blocks comprising the portions of the text of each of the plurality of text elements displayed in the result display area, wherein at least two of the text display blocks have different amounts of data and are displayed at different levels of granularity, and, wherein the adjusting granularity is dynamic, visible and concurrent with the movement of the control.

32. The method of claim 31, further comprising:

maintaining the onscreen position of the topmost text element of the data while adjusting the granularity for the size of each of the displayed text display blocks comprising the portions of the text displayed.

33. The method of claim 31, further comprising:

maintaining an aspect of the text of each of the displayed plurality of text elements throughout the adjusting the granularity for size of each of the displayed text display blocks comprising the portions of the text displayed.

* * * * *

UNITED STATES PATENT AND TRADEMARK OFFICE
CERTIFICATE OF CORRECTION

| | | |
|---|---|---|
| PATENT NO. | : 7,797,643 B1 | Page 1 of 1 |
| APPLICATION NO. | : 10/951915 | |
| DATED | : September 14, 2010 | |
| INVENTOR(S) | : Steven P. Jobs et al. | |

It is certified that error appears in the above-identified patent and that said Letters Patent is hereby corrected as shown below:

IN THE DRAWINGS;
On Sheet 5 of 12, Reference Numeral 40h, in "FIG. 1E", line 1, delete "Busineses" and insert -- Businesses --, therefor.

On Sheet 6 of 12, Reference Numeral 40e, in "FIG. 1F", line 2, delete "hte" and insert -- the --, therefor.

On Sheet 6 of 12, Reference Numeral 40h, in "FIG. 1F", line 1, delete "Busineses" and insert -- Businesses --, therefor.

In column 11, line 24, in claim 10, after "size" insert -- of --.

Signed and Sealed this
Twenty-ninth Day of November, 2011

David J. Kappos
*Director of the United States Patent and Trademark Office*